United States Patent
Inagaki et al.

(10) Patent No.: US 9,422,951 B2
(45) Date of Patent: Aug. 23, 2016

(54) HYDRAULIC CIRCUIT AND CONTROL SYSTEM THEREFOR

(75) Inventors: Takafumi Inagaki, Susono (JP); Yuji Hattori, Gotenba (JP); Tomokazu Inagawa, Susono (JP); Kenta Kimura, Susono (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 452 days.

(21) Appl. No.: 13/983,817

(22) PCT Filed: Feb. 14, 2011

(86) PCT No.: PCT/JP2011/053051
§ 371 (c)(1),
(2), (4) Date: Aug. 6, 2013

(87) PCT Pub. No.: WO2012/111074
PCT Pub. Date: Aug. 23, 2012

(65) Prior Publication Data
US 2013/0305701 A1    Nov. 21, 2013

(51) Int. Cl.
*F16H 57/04* (2010.01)
*F15B 15/20* (2006.01)
(Continued)

(52) U.S. Cl.
CPC ............... *F15B 15/20* (2013.01); *F15B 11/16* (2013.01); *F16H 57/0404* (2013.01);
(Continued)

(58) Field of Classification Search
CPC .... F15B 21/04; F15B 21/041; F15B 2211/61; F15B 2211/611; F15B 2211/615; F16H 57/0402; F16H 57/0404; F16H 57/0405; F16H 2061/0034; F16H 2061/0037; F16H 2061/0043

USPC ................................................. 60/453, 454
See application file for complete search history.

(56) References Cited

U.S. PATENT DOCUMENTS 2,868,382 A * 1/1959 Best ................... B01D 29/0054
                                                    184/6.24
5,102,534 A * 4/1992 Gabet .................. B01D 29/117
                                                    210/106
(Continued)

FOREIGN PATENT DOCUMENTS

EP    0 985 855 A2    3/2000
JP    46-31605        11/1971
(Continued)

OTHER PUBLICATIONS

JP2005273633 Machine Translation, Espacenet.*
(Continued)

*Primary Examiner* — Nathaniel Wiehe
*Assistant Examiner* — Dustin T. Nguyen
(74) *Attorney, Agent, or Firm* — Finnegan, Henderson, Farabow, Garrett & Dunner, LLP (57) ABSTRACT

A hydraulic circuit and a hydraulic control system for preventing fluid leakage and power loss resulting from jamming of contaminants. A first circuit section has an accumulator for storing hydraulic pressure, and a control valve for controlling a passage for delivering fluid from the accumulator to an actuator. Fluid discharged from an oil pump is delivered continuously to a second circuit section. A first filter is disposed on a passage for delivering the fluid from the oil pump to the accumulator for the purpose of removing contaminants finer than those in the fluid to be delivered to the second circuit section from the fluid to be delivered to the accumulator.

10 Claims, 6 Drawing Sheets

(51) Int. Cl.
*F15B 11/16* (2006.01)
*F16H 61/662* (2006.01)
*F16H 61/00* (2006.01)

(52) U.S. Cl.
CPC ............. *F15B 2211/20538* (2013.01); *F15B 2211/30565* (2013.01); *F15B 2211/615* (2013.01); *F15B 2211/7052* (2013.01); *F16H 61/66272* (2013.01); *F16H 2061/0034* (2013.01)

(56) References Cited

U.S. PATENT DOCUMENTS

| | | | |
|---|---|---|---|
| 5,355,676 A | | 10/1994 | Inokuchi |
| 5,435,334 A | * | 7/1995 | Inukai ..................... F01M 1/10 137/115.13 |
| 6,712,724 B2 | | 3/2004 | Katou |
| 6,821,444 B2 | * | 11/2004 | Benenson, Jr. ......... B01D 29/15 210/408 |
| 2006/0196179 A1 | * | 9/2006 | Kesavan ................ B60T 13/686 60/413 |

FOREIGN PATENT DOCUMENTS

| | | | | |
|---|---|---|---|---|
| JP | 59-6403 | | 1/1984 | |
| JP | 62-52209 | | 3/1987 | |
| JP | 2-12562 | | 1/1990 | |
| JP | 4-151004 | | 5/1992 | |
| JP | 5-184212 | | 7/1993 | |
| JP | 2001-38114 | | 2/2001 | |
| JP | 2002-327814 | | 11/2002 | |
| JP | 200573633 | * | 10/2005 | ............. F01M 11/03 |
| JP | 2008-144830 | | 6/2008 | |
| JP | 2011-64280 | | 3/2011 | |
| WO | WO 2010/021218 A1 | | 2/2010 | |

OTHER PUBLICATIONS

Written Opinion of the International Searching Authority in International Application No. PCT/JP2011/053051 (Mailing Date: Mar. 15, 2011).

\* cited by examiner

HYDRAULIC CIRCUIT AND CONTROL SYSTEM THEREFOR

CROSS-REFERENCE TO RELATED APPLICATIONS

This application is a national phase application of International Application No. PCT/JP2011/053051, filed Feb. 14, 2011, the content of which is incorporated herein by reference.

TECHNICAL FIELD

The present invention relates to a hydraulic circuit for delivering and withdrawing hydraulic fluid to/from members actuated hydraulically, and a control system for controlling the hydraulic circuit. More particularly, the present invention relates to a hydraulic circuit comprising a first circuit section in which hydraulic pressure is confined, and a second circuit section to which hydraulic fluid is delivered continuously.

BACKGROUND ART

As well known in the art, the hydraulic pressure is used to transmit power or information about an operating condition. For example, hydraulic pressure established by a pump is delivered to a motor to propel a vehicle or to carry a heavy load. In addition, a pressure level of the hydraulic pressure to be delivered to an actuator such as a motor is regulated, and the hydraulic pressure is also used as a control signal for permitting and blocking a delivery of the hydraulic fluid.

One example of a hydraulic circuit of this kind is described in the European Patent No. EP0985855. A belt-driven continuously variable transmission is employed in the vehicle disclosed in the European Patent No. EP0985855. According to the teachings of the European Patent No. EP0985855, a hydraulic circuit is comprised of a motor driven oil pump and an accumulator for storing hydraulic fluid delivered from the oil pump. A speed ratio and a clamping pressure of the continuously variable transmission are controlled by controlling the hydraulic pressure applied to hydraulic chambers of a primary pulley and a secondary pulley from the oil pump and the accumulator. For this purpose, delivery of the hydraulic fluid to the primary and secondary pulleys is controlled using electrically-controlled solenoid valves. Specifically, when the feeding solenoid valve is energized to be opened, the hydraulic fluid is allowed to be delivered to the primary pulley thereby decreasing a speed ratio, and also allowed to be delivered to the secondary pulley thereby increasing a clamping pressure. In contrast, when the draining solenoid valve is energized to be opened, the hydraulic fluid is withdrawn from the primary pulley thereby increasing a speed ratio, and also withdrawn from the secondary pulley thereby decreasing a clamping pressure. The speed ratio and the clamping pressure thus controlled are held constant by closing all of the solenoid valves to confine the hydraulic fluid in the hydraulic chambers of the primary pulley and the secondary pulley.

The oil to be delivered to the vehicle transmission is used not only to transmit a power or acting force but also used for a lubrication purpose. The lubrication oil is delivered to a frictional contact surface and forms an oil film thereon. Therefore, contaminants such as metallic dust, carbon dust etc. may be mixed with the lubricating oil. For example, Japanese Patent Laid-Open No. 2008-144830 discloses a solution to avoid such an event by delivering the lubricating oil to a toroidal continuously variable transmission through a filter. Japanese Patent Laid-Open No. H05-184212 also discloses a structure configured to such oil into the oil pump through a filter.

Thus, in the system using the oil to control the actuators and to lubricate a site of friction, a filter is conventionally employed to remove the contaminants from the oil thereby avoiding clogging of valves and oil passages. Therefore, in the hydraulic control system for the belt-driven continuously variable transmission taught by the European Patent No. EP0985855, such a filter is also disposed at a suction inlet of the motor-driven oil pump to remove the contaminants from the oil sucked from an oil pan.

It is possible to capture the contaminants certainly by using a fine filter. In case of using the fine filter, however, the filter may become quickly clogged with the captured contaminant thereby increasing resistance of the oil to flow through the filter. When confining pressure within the hydraulic chambers of the primary and the secondary pulleys by closing the solenoid valves as described in the European Patent No. EP0985855, such fine filter may prevent contaminants from getting stuck between a valve seat and a valve element of the solenoid valve so that the pressure can be confined within the hydraulic chambers certainly. However, such fine filter will increase resistance to pump up the oil, and this will result in an increase in a power loss. In addition, the oil pump has to be continuously driven to deliver the oil not only to the hydraulic chambers of the primary and the secondary pulleys for the purpose of controlling the speed ratio and the clamping pressure of the belt-driven CVT, but also to lubrication points such as bearings, clutches, gears etc. In this situation, therefore, the power loss will be further increased.

DISCLOSURE OF THE INVENTION

In order to solve the foregoing technical problems, it is an object of this invention to provide a hydraulic circuit and a control system therefore for reducing a power loss, by removing contaminants sufficiently from fluid delivered to a first circuit section having an accumulator and a second circuit section to which the fluid is delivered continuously.

The hydraulic circuit of the present invention is comprised of: a first circuit section, which has an accumulator for storing hydraulic pressure, and a control valve for opening and closing a passage for delivering hydraulic fluid from the accumulator to a predetermined actuator; an oil pump that delivers the hydraulic fluid to the accumulator; and a second circuit section to which the hydraulic fluid discharged from the oil pump is delivered continuously. In order to solve the above-explained technical problems, hydraulic circuit of the present invention is provided with a first filter that removes contaminants finer than those contained in the hydraulic fluid to be delivered to the second circuit section from the hydraulic fluid to be delivered to the accumulator.

The first filter is disposed on another passage for delivering the hydraulic fluid to the accumulator branched off from a passage for delivering the hydraulic fluid from the oil pump to the second circuit section.

The control valve includes a feeding valve that opens and closes the passage for delivering hydraulic fluid from the accumulator to the actuator, and a drain valve that withdraws the hydraulic fluid from the actuator. Those feeding valve and the drain valve are adapted to close a port thereof by pushing a valve element onto a valve seat.

The actuator includes a hydraulic chamber of an automatic transmission adapted to vary a speed ratio by delivering the hydraulic fluid thereto and withdrawing the hydraulic fluid therefrom.

In the accumulator, hydraulic pressure higher than that in the second circuit section is stored.

The actuator includes a hydraulic chamber for controlling speed ratio that narrows a belt groove to increase an effective diameter of a belt by delivering the hydraulic fluid thereto, and a hydraulic chamber for controlling a belt clamping pressure that increases the belt clamping pressure by delivering the hydraulic fluid thereto. The second circuit section includes a lubrication point that is continuously lubricated by the hydraulic fluid delivered from the oil pump.

The hydraulic circuit of the present invention further comprises a second filter that removes contaminants from the hydraulic fluid passing therethrough that is discharged from the oil pump or sucked by the oil pump. In addition, a mesh size of the first filter is finer than that of the second filter.

The hydraulic circuit of the present invention further comprises a first on/off valve, that is disposed on said another passage for delivering the hydraulic fluid from the oil pump to the accumulator to open and close said another passage.

A switching valve may be used as the first on/off valve to selectively opens said another passage, closes said another passage, and connects the accumulator with a drain spot.

The hydraulic circuit of the present invention further comprises a bypass passage arranged on said another passage for delivering the hydraulic fluid from the oil pump to the accumulator to circumvent the first filter, and a second on/off valve that opens and closes the bypass passage.

According to another aspect of the present invention, there is provided a control system for the above-explained hydraulic circuit. The control system is provided with a contaminants removal means that removes contaminants captured by the first filter from the first filter.

The contaminants removal means includes a means that allows the hydraulic fluid to flow from the accumulator side toward the second circuit section via the first filter.

The contaminants removal means includes a means that removes contaminants captured by the first filter from the first filter by switching the first on/off valve in a manner to open said another passage, when the hydraulic pressure in the accumulator is higher than a discharge pressure of the oil pump or the hydraulic pressure in the second circuit section.

The contaminants removal means includes a means that removes the contaminants captured by the first filter from the first filter by switching the switching valve in a manner to connect the accumulator with the drain spot.

The contaminants removal means includes a means that removes the contaminants from the first filter at predetermined regular time intervals.

The control system of the present invention further provided with a first on/off valve, that is disposed on said another passage for delivering the hydraulic fluid from the oil pump to the accumulator to open and close said another passage; and a contaminants removal means that removes contaminants captured by the first filter from the first filter by switching the first on/off valve in a manner to open said another passage, when the hydraulic pressure in the accumulator is higher than a discharge pressure of the oil pump or the hydraulic pressure in the second circuit section, and the clamping pressure is higher than a predetermined pressure.

The control system of the present invention is further provided with; a switching valve, that is disposed on said another passage for delivering the hydraulic fluid from the oil pump to the accumulator, and that selectively opens said another passage, closes said another passage, and connects the accumulator with a drain spot; and a contaminants removal means that removes contaminants captured by the first filter from the first filter by switching the switching valve in a manner to connect the accumulator with the drain spot when the clamping pressure is higher than a predetermined pressure.

According to the present invention, the hydraulic fluid discharged from the oil pump is delivered to the first circuit section having the accumulator and to the second circuit section. Specifically the hydraulic fluid is delivered continuously to the second circuit section, but delivered to the first circuit section only when the pressure in the accumulator drops. On this occasion, the hydraulic fluid is delivered to the first circuit section through the first filter adapted to capture contaminants finer than those contained in the hydraulic fluid to be delivered to the second circuit section. Therefore, although the first filter increases a resistance to the fluid flow therethrough toward the first circuit section, the hydraulic fluid is not always delivered to the first circuit section. For this reason, power loss will not be increased significantly.

Thus, the contaminants are removed from the hydraulic fluid to be stored in the accumulator by the first filter. Therefore, the hydraulic fluid from which the contaminants have already been sufficiently removed is delivered from the accumulator to the control valves and the actuators. For this reason, the contaminants will not remain stuck between the valve element and the valve seat of those valves so that a leakage from those valves can be avoided. That is, the hydraulic fluid can be confined certainly to reduce the power loss. In addition, according to the hydraulic circuit of the present invention, it is not necessary to dispose a filter on the passage for delivering the hydraulic fluid from the accumulator to the control valves and the actuators. Therefore, resistance to the fluid flow toward the control valves and the actuators can be reduced to improve hydraulic response.

Accordingly, a fuel economy of vehicles can be improved by applying the present invention to a hydraulic circuit for delivering and withdrawing the hydraulic fluid to/from a hydraulic chamber of an automatic transmission to control a speed ratio.

When the pressure in the first circuit section having the accumulator is higher than that in the second circuit section having the lubrication point, the oil pump is not required to discharge high pressure fluid. Therefore, energy will not be wasted to drive the oil pump more than necessary so that energy efficiency is improved. That is, if the oil pump always discharges high pressure fluid required by the accumulator, surplus fluid would be wasted while being drained to the second circuit section. However, according to the present invention, the energy will not be consumed wastefully.

Accordingly, a fuel economy of a vehicle having a belt-driven continuously variable transmission can be improved by applying the present invention to a hydraulic circuit for the belt-driven continuously variable transmission.

As described, the mesh size of the second filter for capturing the contaminants in the fluid to be delivered to the second circuit section is larger than that of the first filter. Therefore, the resistance of the fluid being delivered to the second circuit section continuously through the second filter is relatively small so that power loss can be reduced.

According to the present invention, delivery of the fluid from the oil pump to the accumulator or the first circuit section can be blocked by closing the passage by the first on/off valve. Consequently, leakage of the fluid from the accumulator or the first circuit section toward the second circuit section can be prevented, and the accumulator is allowed to serve as a hydraulic source for controlling the first circuit section. In this situation, the contaminants adhering to the first filter can be washed out by opening the first on/off valve to open the passage thereby allowing the fluid to flow backwardly from the accumulator toward the first filter.

As also described, the switching valve adapted to selectively connect the accumulator with the drain spot can be used as the first on/off valve. Since the pressure at the drain spot is lower than the pressure in the accumulator, the fluid is allowed to flow backwardly toward the first filter at any time to discharge the contaminants removed from the first filter to the drain spot.

According to the present invention, the bypass passage may be arranged to circumvent the first filter, and the bypass passage is opened and closed by the second on/off valve. This provides rapid delivery of the fluid from the oil pump to the accumulator or the first circuit section without being subjected to resistance of the first filter by opening the second on/off valve.

According to the present invention, the contaminants are thus removed from the hydraulic fluid to be delivered to the first circuit section by controlling the hydraulic circuit by the control system. Therefore, clogging of the first filter can be prevented, and flow resistance or power loss can be reduced.

BEST MODE FOR CARRYING OUT THE INVENTION

Next, the present invention will be explained in more detail. The hydraulic circuit of the present invention is comprised of a first circuit section having an accumulating device serving as a hydraulic source, an oil pump for delivering hydraulic fluid to the accumulating device, and a second circuit section to which the hydraulic fluid is delivered continuously during activation of the oil pump. For example, in the hydraulic circuit of an automatic continuously variable transmission comprising a belt-driven continuously variable transmission, those circuit sections will require different hydraulic pressures and different amounts of hydraulic fluid.

Figure 6:
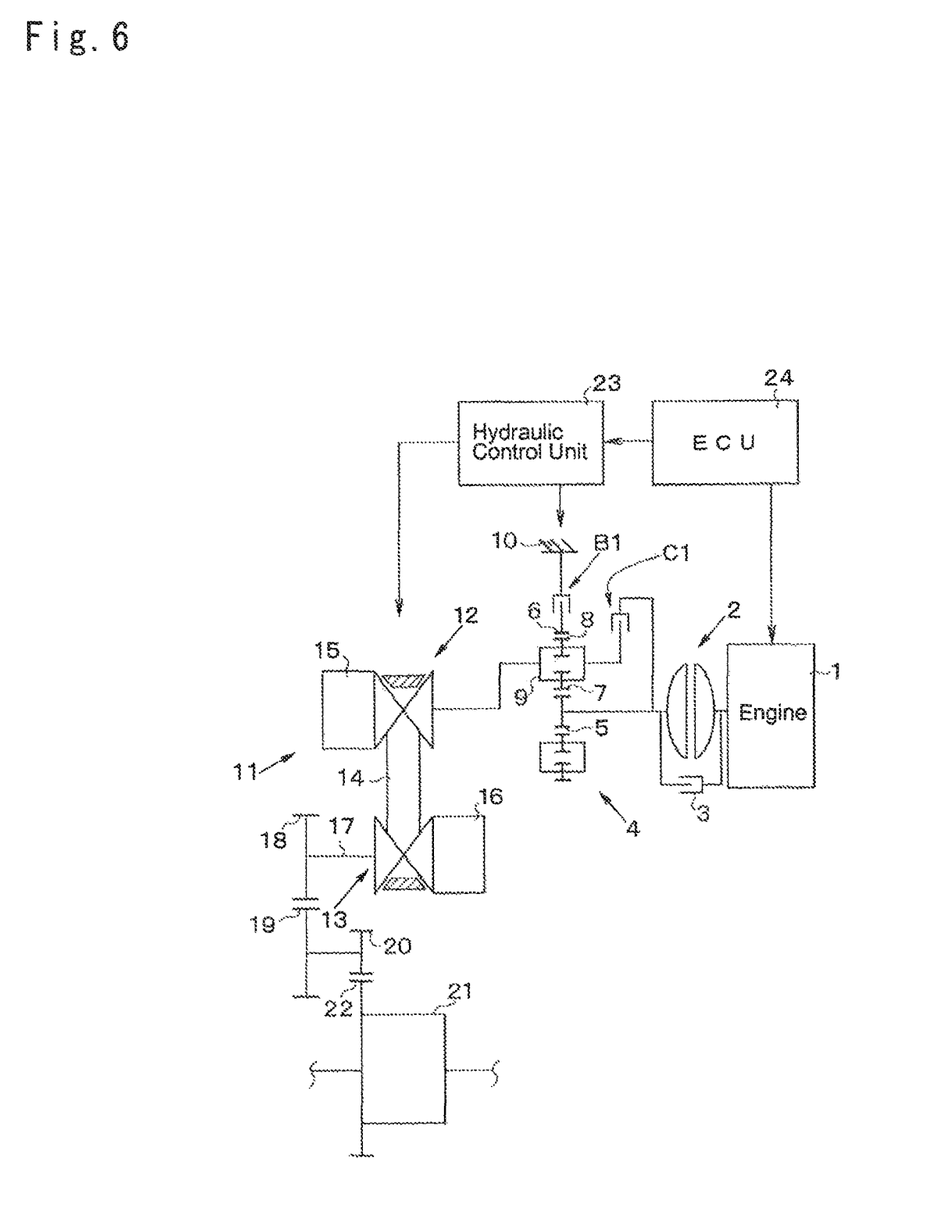
FIG. 6 is a view schematically illustrating one example of an automatic transmission to which the present invention is applied.

Referring now to the drawings, FIG. 6 illustrates one example of the automatic continuously variable transmission comprising a belt-driven continuously variable transmission. In the preferred example shown in FIG. 6, an internal combustion engine such as a gasoline engine may be used as a prime mover. Alternatively, a hybrid power source using an electric motor together with the internal combustion engine may also be used as the prime mover. In the preferred example to be explained hereinafter, an engine 1 is employed as the prime mover.

A torque converter (T/C) 2 is connected to an output side of the engine 1. As the conventional torque converters used widely in automobiles, the torque converter 2 is provided with a lock-up clutch 3 for connecting an input element directly with an output element. In turn, a torque reversing mechanism 4 is connected with the torque converter 2. Any kind of device adapted to output a torque inputted thereto with or without switching a torque direction may be used as the torque reversing mechanism 4. In the preferred example shown in FIG. 6, specifically, the torque reversing mechanism 4 is composed mainly of a double-pinion type planetary gear mechanism comprising a sun gear 5 connected to an output element of the torque converter 2, a ring gear 6 as an internal gear arranged concentrically with the sun gear 5, a pinion gear 7 arranged in the ring gear 6 to mesh with the sun gear 5, another pinion gear 8 meshing with the pinion gear 7 and the ring gear 6, and a carrier 9 holding the pinion gears 7 and 8 in a manner to allow a rotation and a revolution of the pinion gears 7 and 8.

A clutch C1 is arranged to allow the torque reversing mechanism 4 to output the torque inputted to the sun gear 5 without reversing the torque direction thereby moving the vehicle in the forward direction. For this purpose, the clutch C1 rotates the above-mentioned double pinion type planetary gear mechanism integrally by connecting any of two elements of the planetary gear mechanism. Specifically, in the preferred example shown in FIG. 6, the clutch C1 selectively connects the sun gear 5 with the carrier 9. In this preferred example, a wet-type multiple disc clutch serves as the clutch C1, and the clutch C1 is provided with a hydraulic chamber (i.e., a hydraulic actuator) for bringing friction discs and plates into close contact (those elements are not shown in the figure).

In turn, a brake B1 is arranged to allow the torque reversing mechanism 4 to output the torque inputted to the sun gear 5 while reversing the torque direction thereby moving the vehicle in the backward direction. For this purpose, in the preferred example shown in FIG. 6, the brake B1 stops rotation of the ring gear 6 by a reaction force resulting from selectively engaging the ring gear 6 with a fixing portion 10. A wet-type multiple disc clutch having a hydraulic chamber (i.e., a hydraulic actuator) for bringing friction discs and plates (those elements are not shown in the figure) into close contact is also used as the brake B1. In the preferred example shown in FIG. 6, therefore, the sun gear 5 serves as an input element, the ring gear 6 serves as a reaction element, and the carrier 9 serves as the output element. Thus, the planetary gear mechanism is rotated integrally by engaging the clutch C1 to connect the sun gear 5 with the carrier 9. As a result, the planetary gear mechanism is allowed to output the torque inputted from the sun gear 5 and the carrier 9 without switching the torque direction thereby propelling the vehicle in the forward direction. In contrast, when the ring gear 6 is halted by engaging the brake B1 instead of the clutch C1, the carrier 9 is rotated in the opposite direction to the sun gear 9. As a result, the planetary gear mechanism is allowed to output the torque while switching the torque direction thereby moving the vehicle in the backward direction.

A belt-driven continuously variable transmission 11 is connected to an output side of the torque reversing mechanism 4. The continuously variable transmission 11 is a conventional belt-driven CVT comprising a pair of pulleys 12 and 13, and a belt 14 mounted on those pulleys 12 and 13. Specifically, each pulley 12 and 13 is comprised of a fixed sheave and a movable sheave being opposed to each other, and the belt 14 is held in a V-groove formed between those sheaves. The pulley 12 is connected to the carrier 9 of the torque reversing mechanism 4 to serve as a drive pulley (i.e., a primary pulley). The primary pulley 12 is provided with a hydraulic chamber (i.e., an actuator) 15 on a back face of the movable sheave thereof. Therefore, a width of the V-groove is narrowed to increase an effective diameter of the belt 14 by increasing an internal pressure of the hydraulic chamber 15, in other words, by increasing a volume of the hydraulic fluid delivered to the hydraulic chamber 15. That is, in the preferred example shown in FIG. 6, a speed ratio of the continuously variable transmission 11 is varied by controlling an internal pressure of the primary pulley 12 or a volume of the hydraulic fluid delivered to the primary pulley 12.

Meanwhile, the other pulley 13 serves as a driven pulley (i.e., a secondary pulley). The secondary pulley is also provided with a hydraulic chamber (i.e., an actuator) 16 on a back face of the movable sheave thereof. Therefore, a clamping pressure for clamping the belt 14, that is, a torque transmitting capacity is controlled by controlling the hydraulic pressure delivered to the hydraulic chamber 16. An output gear 18 is disposed on a pulley shaft 17 of the secondary pulley 13 to be meshed with a counter driven gear 19. The counter driven gear 19 is integrated with a counter drive gear 20, and the counter drive gear 20 is meshed with a ring gear 22 of a differential gear 21 serving as a final reduction unit. Accordingly, the torque is transmitted from the differential gear 21 to (not shown) drive wheels.

A hydraulic control system 23 is provided to hydraulically control the lock-up clutch 3, the clutch C1, the brake B1, the continuously variable transmission 11 and etc. The hydraulic control system 23 is comprised of a plurality of valves, and the hydraulic pressures for actuating the lock-up clutch 13, the clutch C1 and the brake B1 are controlled by electrically controlling those valves. In addition, the speed ratio and the clamping pressure of the continuously variable transmission 11 are also varied by controlling those valves. The structure of the hydraulic control system 23 will be explained later in more detail.

An electronic control unit (ECU) 24 is provided to control the speed ratio and the belt clamping pressure, and to control the hydraulic fluid delivered to the clutch C1 and the brake B1. The electronic control unit 24 is composed mainly of a microcomputer, and configured to output a command signal while carrying out a calculation based on data inputted thereto and data stored in advance. In addition, the electronic control unit 24 sends a command signal also to the hydraulic control system 23 and the engine 1 for the purpose of controlling an output of the engine 1.

Figure 1:
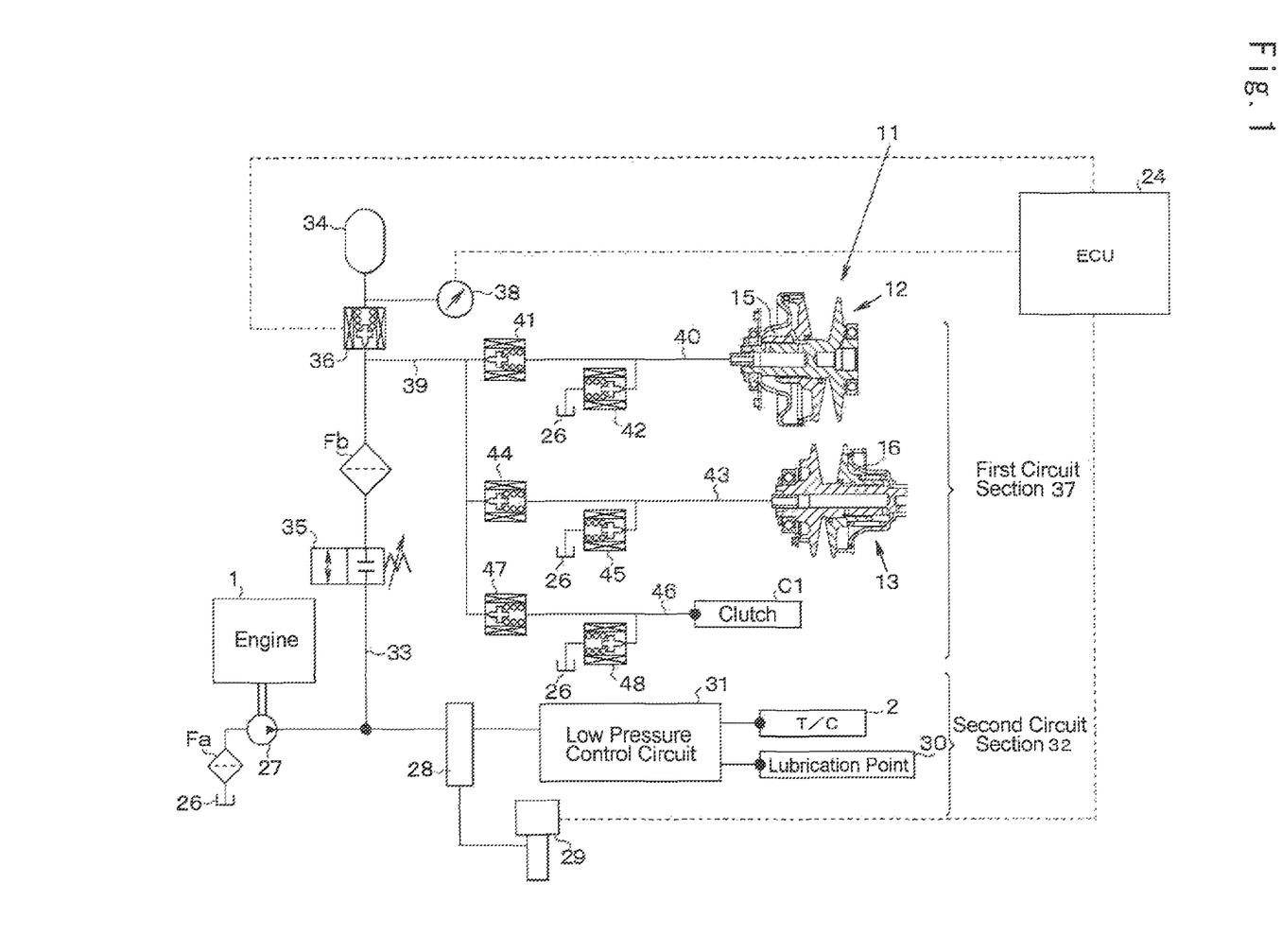
FIG. 1 is a hydraulic circuit schematically illustrating one example of the present invention.

In the hydraulic circuit of the hydraulic control system 23 for controlling the automatic transmission, a feeding solenoid valve and a draining solenoid valve are arranged individually for controlling hydraulic pressures in the hydraulic chamber 15 of the primary pulley 12, the hydraulic chamber 16 of the secondary pulley 13, the clutch C1 and the brake B1. Therefore, the speed ratio and the clamping pressure of the transmission are controlled by actuating those solenoid valves electrically. An example is schematically illustrated in FIG. 1. As shown in FIG. 1, an oil pump (i.e., a mechanical oil pump) 27 is arranged in the hydraulic circuit in a manner to be driven by the engine 1 to discharge the oil introduced from an oil pan 26.

In order to capture contaminants contained in the hydraulic fluid such as metallic dust, carbon dust etc., a main filter Fa is disposed between the oil pan 26 and a suction inlet of the oil pump 27. A mesh size of the main filter Fa is selected to capture the contaminants having a size which may disrupt operation of the oil pump 27, the torque converter 2 and hydraulic control devices thereof. Specifically, the main filter Fa serves as the second filter of the present invention.

A discharging outlet of the oil pump 27 is connected to a pressure regulator valve 28 serving as a primary regulator valve for regulating a pressure level of the hydraulic fluid discharged from the oil pump 27, and the pressure regulator valve 28 is connected to a discharge pressure control valve 29 as a linear solenoid valve. That is, in the pressure regulator valve 28, an output pressure (i.e., a discharging pressure) of the oil pump 27 and a signal pressure discharged from the discharge pressure control valve 29 counteract each other across a spool. Therefore, the pressure of the hydraulic fluid discharged from the oil pump 27 is regulated to a higher level by raising the signal pressure applied to the pressure regulator valve 28. For this purpose, the discharge pressure control valve 29 is connected to the electronic control unit 24.

Thus, in the pressure regulator valve 28, the spool is displaced according to a balance between the loads (i.e., pressures) counteracting each other to regulate the pressure level. Therefore, the hydraulic fluid is drained from the pressure regulator valve 28 as a result of regulating the pressure level. The hydraulic fluid thus drained is controlled by a low pressure control circuit 31 to be delivered to the torque converter 2 and a lubrication point 30. For this purpose, the low pressure control circuit 31 is provided with a plurality of hydraulic control devices such as a regulator valve, a modulator valve, a diversion valve, an on/off valve and so on. Accordingly, the low pressure control circuit 31, the torque converter 2 and the lubrication point 30 form a second circuit section 32 to which the hydraulic fluid drained from the pressure regulator valve 28 is delivered.

An accumulator 34 is also connected to the discharging outlet of the oil pump 27 through a passage 33, and an on/off valve 35 is disposed on the passage 33 to selectively open and close the passage 33. For example, a solenoid valve opened and closed electrically may be used as the on/off valve 35. A sub-filter Fb serving as the first filter of the present invention is disposed on the passage 33 between the on/off valve 35 and the accumulator 34. A mesh size of the sub-filter Fb is finer than that of the aforementioned main filter Fa. Therefore, contaminants finer than those contained in the hydraulic fluid being delivered to the second circuit section 32 can be captured by the sub-filter Fb to be removed from the hydraulic fluid being delivered to the accumulator 34.

The accumulator 34 serves as a hydraulic source for controlling the continuously variable transmission 11 and the clutch C1 or the brake B1, and, a pressure storing control valve 36 which is controlled electrically is connected to an inlet/outlet port of the accumulator 34. Thus, the hydraulic circuit shown in FIG. 1 is divided by the on/off valve 35 into the second circuit section 32 and the first circuit section 37 including the continuously variable transmission 11 operated by high pressure. The pressure storing control valve 36 is also controlled by the electronic control unit 24. In addition, a pressure in the accumulator 34 is detected by a hydraulic sensor 38 and a detected signal is transmitted to the electronic control unit 24.

A passage 39 is branched off from the passage 33 between the pressure storing control valve 36 and the on/off valve 35 to deliver the hydraulic fluid to the continuously variable transmission 11 and the clutch C1 or the brake B1. To this end, a passage 40 further extends from the passage 39 to connect the passage 39 with the hydraulic chamber 15 of the primary pulley 12, and a feeding solenoid valve 41 is disposed on the passage 40. Therefore, the hydraulic fluid is delivered selectively to the hydraulic chamber 15 of the primary pulley 12 by opening and closing the passage 40 by the feeding solenoid valve 41. In addition, the hydraulic chamber 15 of the primary pulley 12 is connected to a drain solenoid valve 42 to drain the fluid to a drain spot such as an oil pan 26. Specifically, in the preferred example shown in FIG. 1, the drain solenoid valve 42 is connected with the passage 40 between the feeding solenoid valve 41 and the hydraulic chamber 15.

For example, an electrically controlled poppet valve may be used as the feeding solenoid valve 41 and the drain solenoid valve 42. Specifically, when the poppet valve is not energized (i.e., under OFF state), a valve element is pushed onto a valve seat to close a port of the poppet valve thereby preventing a leakage of the hydraulic fluid. Therefore, the hydraulic fluid is confined in the hydraulic chamber 15 to maintain a speed ratio and a torque transmitting capacity even when a power distribution is stopped.

A structure of a mechanism for delivering the hydraulic fluid to the hydraulic chamber 16 of the secondary pulley 13 to establish a clamping force is similar to that of the mechanism for delivering the hydraulic fluid to the hydraulic chamber 15. Specifically, a passage 43 is further branched off from the passage 39 to connect the passage 39 with the hydraulic chamber 16 of the secondary pulley 13, and a feeding solenoid valve 44 is disposed on the passage 43. Therefore, the hydraulic fluid is delivered selectively to the hydraulic chamber 16 of the secondary pulley 13 by opening and closing the passage 43 by the feeding solenoid valve 44. In addition, the hydraulic chamber 16 of the secondary pulley 13 is connected to a drain solenoid valve 45 to drain the fluid to a drain spot such as an oil pan 26. Specifically, in the preferred example shown in FIG. 1, the drain solenoid valve 45 is connected with the passage 43 between the feeding solenoid valve 44 and the hydraulic chamber 16.

The electrically controlled poppet valve may also be used as the feeding solenoid valve 44 and the drain solenoid valve 45. Specifically, when the poppet valve is not energized (i.e., under OFF state), a valve element is pushed onto a port to close the poppet valve thereby preventing a leakage of the hydraulic fluid. Therefore, the hydraulic fluid is confined in the hydraulic chamber 16 to maintain a speed ratio and a torque transmitting capacity even when a power distribution is stopped.

In addition, a passage 46 is further branched off from the passage 39 to connect the passage 39 with the clutch C1, and a feeding solenoid valve 47 is disposed on the passage 46. Therefore, the hydraulic fluid is delivered selectively to the clutch C1 by opening and closing the passage 46 by the feeding solenoid valve 47. In addition, a hydraulic chamber of the clutch C1 is connected to a drain solenoid valve 48. As the feeding solenoid valve 47, the electrically controlled poppet valve may also be used as the drain solenoid valve 48 to drain the fluid to a drain spot. Accordingly, when the feeding solenoid valve 47 and the drain solenoid valve 48 are not energized (i.e., under OFF state), the ports of those valves 47 and 48 are closed to prevent a leakage of the hydraulic fluid. Therefore, a torque transmitting capacity can be maintained by engaging the clutch C1 even when a power distribution is stopped. Although not especially shown in FIG. 1, the brake B1 is also provided with the control valves for delivering and draining the hydraulic fluid similar to those controlling the clutch C1. In addition, the above-explained solenoid valves 41, 42, 44, 45, 47 and 48 are controlled by the electronic control unit 24.

In the above-explained hydraulic circuit, when the engine 1 is driven to propel the vehicle, the oil pump 27 is driven by a power of the engine 1 to discharge the hydraulic fluid. The pressure discharged from the oil pump 27 is regulated to a required pressure level by the pressure regulator valve 28. For this purpose, the electronic control unit 24 causes the discharge pressure control valve 29 to send a signal pressure to the pressure regulator valve 28 to achieve a desired pressure level. The hydraulic fluid drained as a result of such pressure regulation is delivered to the torque converter 2 and the lubrication point 30 through the low pressure control circuit 31.

Meanwhile, a pressure level of the hydraulic fluid regulated by the pressure regulator valve 28 is higher than the pressure level of the hydraulic fluid in the high pressure circuit section such as the passage 39. Therefore, the hydraulic fluid regulated by the pressure regulator valve 28 is delivered toward the passage 39 by opening the on/off valve 35, and stored in the accumulator 34 by opening the pressure storing control valve 36. Specifically, the accumulator 34 has to be charged with the hydraulic fluid when the hydraulic pressure therein drops to a level lower than a predetermined level. To this end, the hydraulic fluid discharged from the oil pump 27 is delivered to the accumulator 34 through the passage 33, and the contaminants are captured by the sub-filter Fb on the way to the accumulator 34. Therefore, the contaminants larger than the mesh size of the sub-filter Fb are removed from the hydraulic fluid to be delivered to the first circuit section 37.

Specifically, the hydraulic fluid stored in the accumulator 34 is delivered to the first circuit section 37 by opening the pressure storing control valve 36 while closing the on/off valve 35. The speed ratio and the clamping pressure of the continuously variable transmission 11, as well as engagement status of the clutch C1 are controlled by the hydraulic fluid thus delivered to the first circuit section 37. For example, an upshifting of the continuously variable transmission 11 is achieved by opening the feeding solenoid valve 41 to deliver the hydraulic fluid to the hydraulic chamber 15 of the primary pulley 12. In this situation, the groove width of the primary pulley 12 is narrowed to increase an effective diameter of the belt 14 on the primary pulley 12, and an effective diameter of the belt 14 on the secondary pulley 13 is reduced in consequence. As a result, the speed ratio of the continuously variable transmission 11 is reduced. To the contrary, the effective diameter of the belt 14 on the primary pulley 12 is reduced by opening the drain solenoid valve 42 to withdraw the hydraulic fluid from the hydraulic chamber 15. As a result, the effective diameter of the belt 14 on the secondary pulley 13 is increased so that the speed ratio of the continuously variable transmission 11 is increased.

Meanwhile, the pressure for clamping the belt 14 is increased by opening the feeding solenoid valve 44 to deliver the hydraulic fluid to the hydraulic chamber 16 of the secondary pulley 13. Consequently, the torque transmitting capacity of the continuously variable transmission 11 is increased. To the contrary, the pressure for clamping the belt 14 is reduced by opening the drain solenoid valve 45 to withdraw the hydraulic fluid from the hydraulic chamber 16. Consequently, the torque transmitting capacity of the continuously variable transmission 11 is decreased. In turn, the clutch C1 is engaged to propel the vehicle in the forward direction by opening the feeding solenoid valve 47 to deliver the hydraulic fluid thereto. In this situation, the brake B1 is disengaged. To the contrary, the vehicle is propelled in the backward direction by opening the drain solenoid valve 48 to withdraw the fluid from the clutch C1 to open the clutch C1, while engaging the brake B1. The foregoing controls of the first circuit section 37 are basically carried out using the hydraulic pressure in the accumulator 34 provided that the pressure level in the accumulator 34 is sufficiently high.

As described, the contaminants have already been removed from the hydraulic fluid stored in the accumulator 34. Therefore, in case of using the accumulator 34 as the hydraulic source to control the speed ratio, the belt clamping pressure, the clutch C1 and the brake B1, it is unnecessary to filter the hydraulic fluid discharged from the accumulator 34 again. For this reason, flow resistance of the hydraulic fluid will not be increased so that the hydraulic fluid is allowed to be delivered smoothly to the hydraulic chambers 15 and 16 as the actuators. Consequently, a responsiveness of the hydraulic circuit may be improved.

When the vehicle is cruising or substantially cruising, the solenoid valves 41, 42, 44, 45, 47 and 48 are closed to confine the hydraulic fluid in the hydraulic chambers 15 and 16 as the actuators. As described, the poppet valve is used as the solenoid valves 41, 42, 44, 45, 47 and 48, and the poppet valve is closed by pushing the valve element pushed onto a valve seat to confine the hydraulic fluid. However, as also explained, the contaminants have already been removed from the hydraulic fluid to be delivered to those solenoid valves 41, 42, 44, 45, 47 and 48. Therefore, the contaminants will not remain stuck between the valve element and the valve seat of those solenoid valves so that a clearance will not be created therebetween. For this reason, the hydraulic fluid confined in the actuators etc. will not leak from the solenoid valves to reduce a power loss resulting from a leakage of the fluid.

When the engine 1 is driven to propel the vehicle, the oil pump 27 is driven by the engine 1 to discharge the hydraulic fluid. In this situation, the torque converter 2 is rotated and a slippage occurs at the lubrication point 30. Therefore, when there is no need to deliver the hydraulic fluid to the accumulator 34 and the first circuit section 37, the pressure regulator valve 28 regulates the pressure level of the fluid discharged from the oil pump 27 to a relatively low level thereby delivering the fluid drained therefrom continuously to the second circuit section 32. In this situation, the main filter Fa removes the contaminant from the hydraulic fluid thus delivered to the second circuit section 32. However, the mesh size of the main filter Fa is as large as that of the ordinary filters for use in the hydraulic circuits. Therefore, the main filter Fa will not especially increase the resistance to flow the hydraulic fluid therethrough, that is, the power loss will not especially be increased. In addition, although the second circuit section always requires fluid delivery, the hydraulic fluid is required to be delivered to the first circuit section only when charging the accumulator 34. Therefore, a small capacity pump may be used as the oil pump 27, that is, the oil pump 27 may be downsized. For this reason, the hydraulic fluid will not be drained unnecessarily in large amount. Accordingly, power loss can be reduced to improve a fuel economy of the vehicle.

However, the sub-filter Fb may become clogged with the contaminants over time. Therefore, the contaminants are removed from the sub-filter Fb by the following procedure. As described, the mesh size of the sub-filter Fb is finer than that of the main filter Fa, that is, the contaminants captured by the sub-filter Fb will not cause any serious problem in the second circuit section 32. Therefore, the contaminants adhering to the sub-filter Fb are washed out by allowing the hydraulic fluid to flow backwardly toward the second circuit section 32 through the sub-filter Fb. Specifically, the contaminants are removed from the sub-filter Fb by opening the pressure storing control valve 36 and the on/off valve 35 under the condition that the pressure in the accumulator 34 is higher than the discharge pressure of the oil pump 27 regulated by the pressure regulator valve 28. The control means thus allowing the hydraulic fluid to flow backwardly through the sub-filter Fb serves as the contaminant removal means of the present invention. Control examples using the electronic control unit 24 are shown in the flowcharts of FIGS. 2 and 3.

Figure 2:
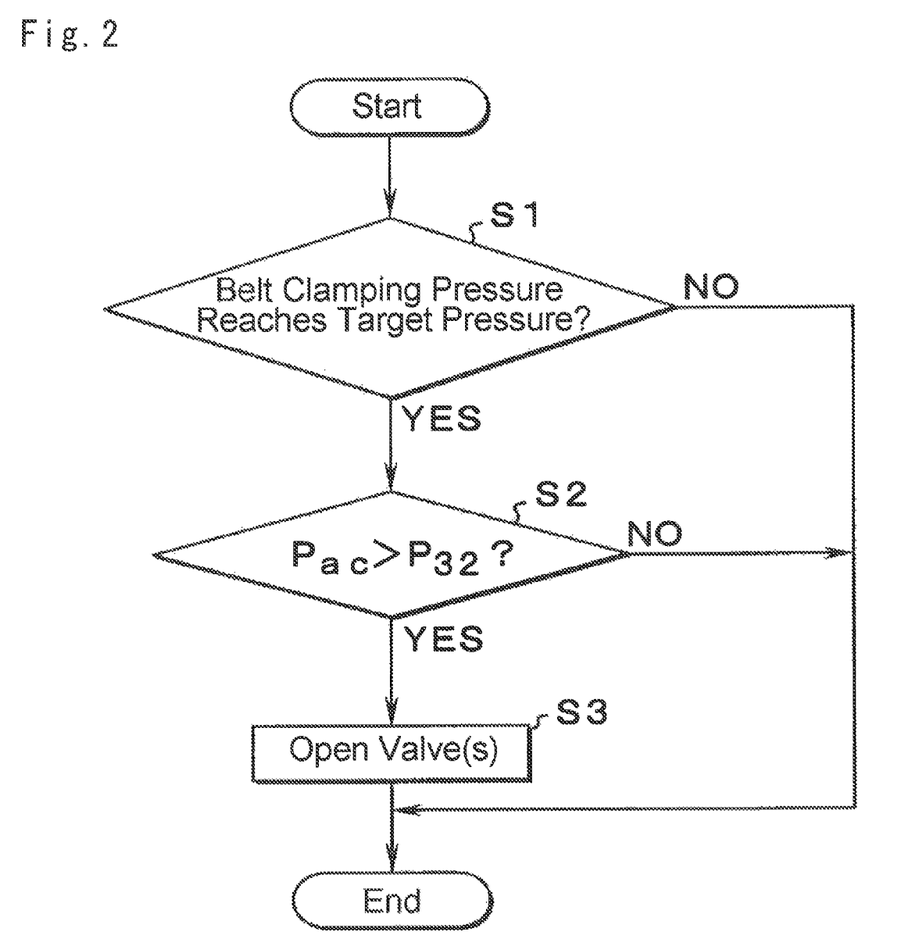
FIG. 2 is a flowchart of a control example for removing contaminants from a sub-filter.
Figure 3:
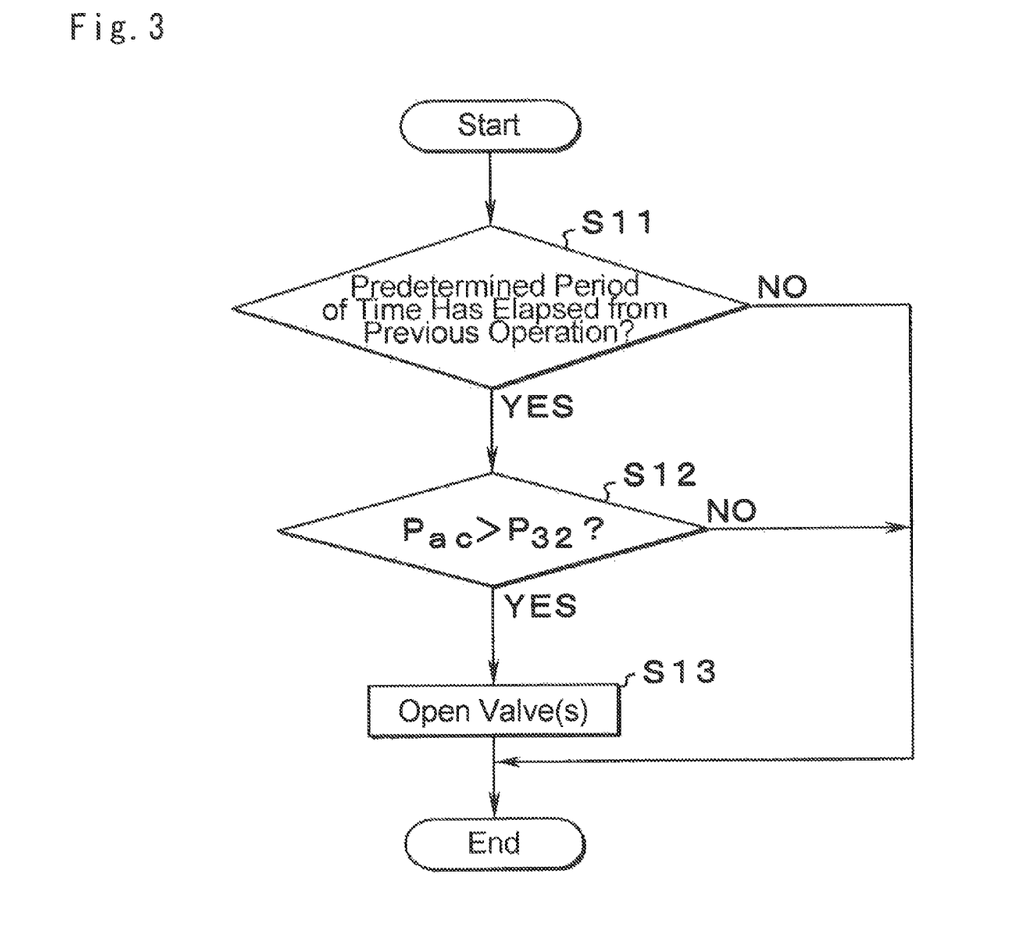
FIG. 3 is a flowchart of another control example for removing contaminants from a sub-filter.

FIG. 2 is a flowchart showing an example to be carried out when starting the vehicle and when stopping the vehicle. First of all, it is determined whether the belt clamping pressure reaches a predetermined target pressure (at step S1). As described, in the continuously variable transmission 11, the belt clamping pressure is established by the hydraulic pressure in the hydraulic chamber 16 of the secondary pulley 13. Therefore, the determination at step S1 is carried out by detecting the pressure in the hydraulic chamber 16 of the secondary pulley 13 and comparing the detected pressure with the target pressure. To this end, the target pressure is determined in accordance with a drive demand of the vehicle, and stored in advance in the form of map data.

That is, the determination of step S1 is carried out to avoid a slippage of the belt 14. Therefore, if the belt clamping pressure does not reach the target pressure so that the answer of step S1 is NO, the routine shown in FIG. 2 is returned without carrying out any specific control. To the contrary, if the belt clamping pressure reaches the target pressure so that the answer of step S1 is YES, it is determined whether the pressure $P_{ac}$ in the accumulator 34 is higher than the pressure $P_{32}$ in the second circuit section 32 (at step S2). For this purpose, the hydraulic sensor 38 is connected to the accumulator 34. Therefore, the determination of step S2 can be made with reference to the detection value of the hydraulic sensor 38. In order to allow the hydraulic fluid to flow backwardly through the sub-filter Fb, the pressure $P_{ac}$ in the accumulator 34 has to be higher than the pressure $P_{32}$ in the second circuit section 32. Therefore, if the answer of step S2 is NO, the routine shown in FIG. 2 is returned without carrying out any specific control. To the contrary, if the pressure $P_{ac}$ in the accumulator 34 is higher than the pressure $P_{32}$ in the second circuit section 32 so that the answer of step S2 is YES, a command signal to open the on/off valve 35 is outputted (at step S3). In this case, the pressure storing control valve 36 may also be opened together with the on/off valve 35.

By thus carrying out the control shown in FIG. 2, the hydraulic fluid is allowed to flow backwardly from the accumulator 34 toward the oil pump 27 or the second circuit section 32 through the sub-filter Fb disposed on the passage 33, under the condition that the belt clamping pressure is maintained sufficiently. Consequently, the contaminants adhering to the sub-filter Fb are washed out. The contaminants thus removed from the sub-filter Fb are to be mixed into the hydraulic fluid flowing toward the second circuit section 32. However, size of the contaminants thus removed from the sub-filter Fb is not large enough to cause any trouble in the elements of the second circuit section 32.

FIG. 3 shows a control example to be carried out when the vehicle is cruising so that the continuously variable transmission 11 is being driven in the stable condition. First of all, it is determined whether a predetermined period of time has elapsed from a previous operation to remove the contaminants from the sub-filter Fb (at step S11). This period of time is determined based on a length of time that it takes the contaminants to adhere to the sub-filter Fb in a considerable amount to interfere with the hydraulic control, or a length of time shorter than such length of time. Such period of time may be found out based on a result of experiment or simulation using actual equipment. If the predetermined period of time has not elapsed from the previous operation so that the answer of step S11 is NO, the routine shown in FIG. 3 is returned without carrying out any specific control. To the contrary, if the answer of step S11 is YES, then it is determined whether the pressure $P_{ac}$ in the accumulator 34 is higher than the pressure $P_{32}$ in the second circuit section 32 as the step S2 in FIG. 2 (at step S12). Likewise, if the answer of step S12 is NO, the routine shown in FIG. 3 is returned without carrying out any specific control. To the contrary if the pressure $P_{ac}$ in the accumulator 34 is higher than the pressure $P_{32}$ in the second circuit section 32 so that the answer of step S12 is YES, the command signal to open the on/off valve 35 is outputted (at step S13). In this case, the pressure storing control valve 36 may also be opened together with the on/off valve 35.

By thus carrying out the control shown in FIG. 3, the hydraulic fluid is allowed to flow backwardly from the accumulator 34 toward the oil pump 27 or the second circuit section 32 through the sub-filter Fb disposed on the passage 33 at regular time intervals. Consequently, the contaminants adhering to the sub-filter Fb are washed out. As the case of carrying out the control shown in FIG. 2, the contaminants thus removed from the sub-filter Fb are to be mixed into the hydraulic fluid flowing toward the second circuit section 32. However, as described, size of the contaminants thus removed from the sub-filter Fb is not large enough to cause any trouble in the elements of the second circuit section 32.

Figure 4:
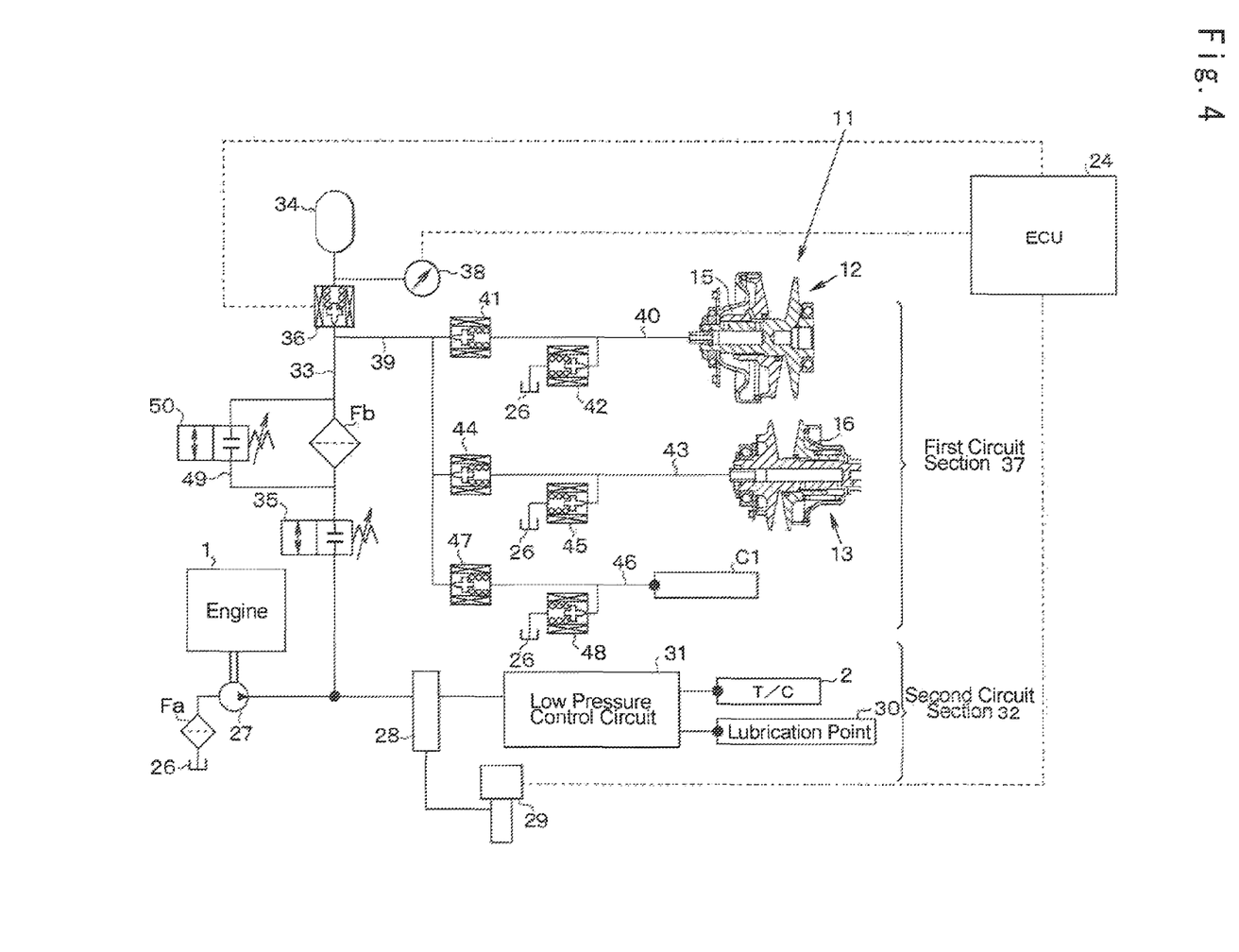
FIG. 4 is a hydraulic circuit schematically illustrating another example of the present invention.

As also described, the fine mesh is selected to serve as the sub-filter Fb to remove the contaminants from the hydraulic fluid delivered to the first circuit section 37 side. Therefore, the sub-filter Fb generates a resistance to the fluid flowing from the oil pump 27 to the first circuit section 37, and the flow resistance is increased with increase in a velocity of the fluid flow FIG. 4 shows an example for avoiding deterioration in the hydraulic response resulting from increase in the flow resistance to provide a rapid delivery of the hydraulic fluid from the oil pump 27 to the first circuit section 37. According to the example shown in FIG. 4, a bypass passage 49 is arranged to circumvent the sub-filter Fb, and an on/off valve 50 is disposed on the bypass passage 49. As the on/off valve 35 disposed between the sub-filter Fb and the oil pump 27, the solenoid valve electrically controlled to open and close the passage may be used as the on/off valve 50.

The on/off valve 50 is basically closed but opened when the speed ratio has to be changed significantly. For example, the on/off valve 50 is opened when an accelerator (not shown) of the vehicle is depressed abruptly or when the vehicle speed drops abruptly. TO this end, for example, an opening degree of the accelerator is detected by a not shown sensor, and a change rate of the opening degree of the accelerator is calculated based on the detected opening degree. In this case, the on/off valve 50 is opened when the calculated change rate of the opening degree exceeds a predetermined threshold. Alternatively, the on/off valve 50 may also be opened based on a fact that a change rate of a detected vehicle speed (i.e., acceleration or deceleration) exceeds a predetermined threshold.

When the on/off valve 50 is opened, the hydraulic fluid is allowed to be delivered from the oil pump 27 to the accumulator 34 or to the first circuit section 37 without passing through the sub-filter Fb. Therefore, the contaminants may be mixed into the hydraulic fluid in the accumulator 34 or in the first circuit section 37. In this situation, however, prompt control of the vehicle is more important rather than avoiding a fluid leakage. Therefore, when the speed ratio has to be changed rapidly, the on/off valve 50 is opened preferentially.

Figure 5:
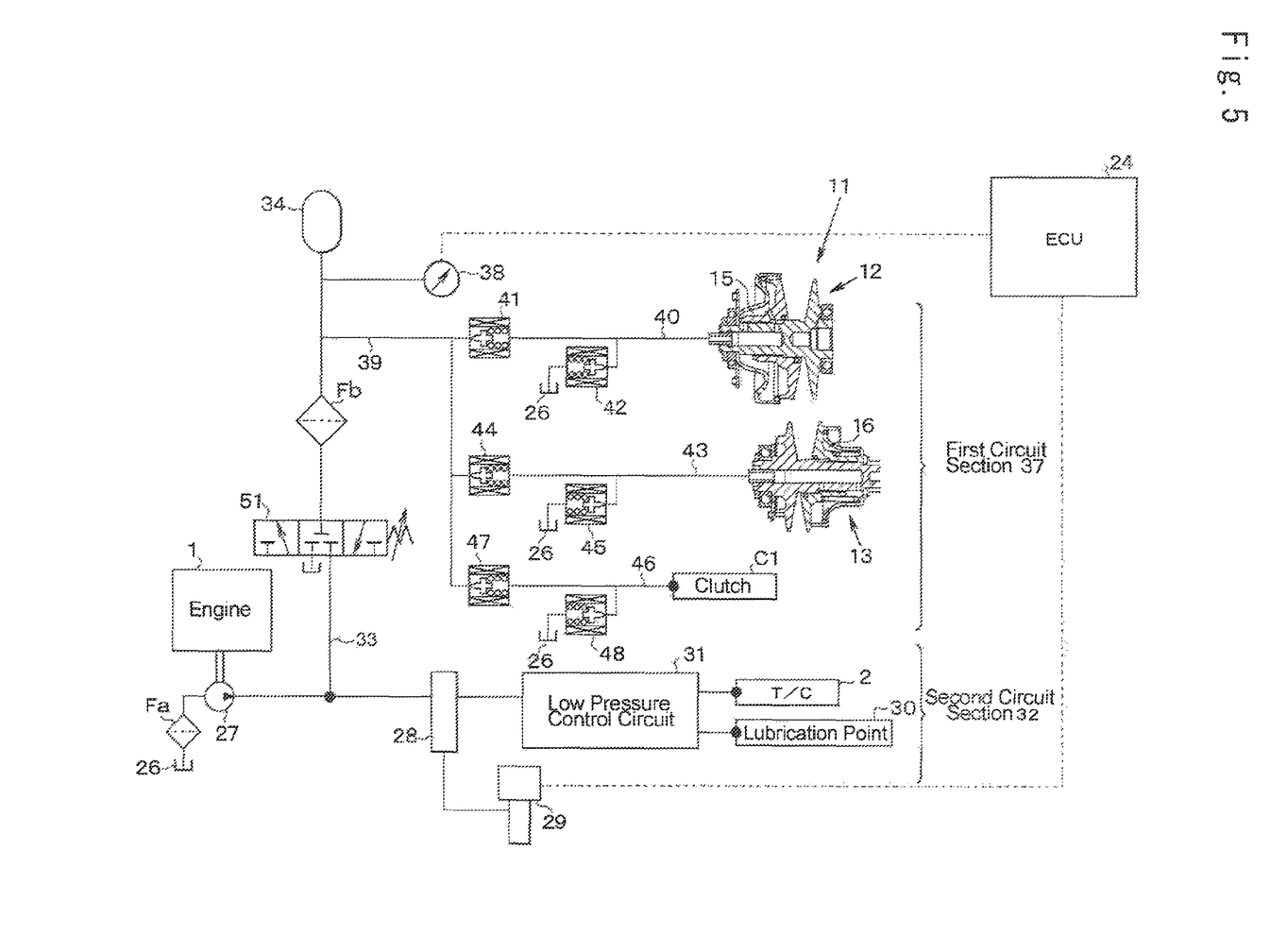
FIG. 5 is a hydraulic circuit schematically illustrating still another example of the present invention.

According to the present invention, a three-way valve may also be used instead of the on/off valve disposed in an upstream side of the sub-filter Fb. As shown in FIG. 5, a three-way solenoid valve 51 is disposed on the passage 33 connecting the oil pump 27 and the accumulator 34, between the sub-filter Fb and the oil pump 27. The three-way solenoid valve 51 is switched by the electronic control unit 24 to selectively control the passage 33. Specifically, the three-way solenoid valve 51 is adapted to connect the oil pump 27 with the sub-filter Fb or the accumulator 34 by opening the passage 33, to disconnect the oil pump 27 with the sub-filter Fb by closing (or blocking) the passage 33, and to connect the sub-filter Fb with the drain spot such as the oil pan 26 by connecting the region of the passage 33 upstream of the sub-filter Fb with the drain spot. In the preferred example shown in FIG. 5, therefore, the aforementioned pressure storing control valve 36 is not arranged so that the accumulator 34 is connected directly with the sub-filter Fb.

According to the preferred example shown in FIG. 5, the three-way solenoid valve 51 closes the passage 33 when the vehicle is cruising or substantially cruising and the hydraulic pressure is stored sufficiently in the accumulator 34. In this situation, therefore, the accumulator 34 serves as a hydraulic source of the first circuit section 37. Meanwhile, the oil pump 27 is required to deliver merely a low pressure fluid to the second circuit section 32 in this situation. Therefore, power consumption of the oil pump 27 can be reduced. When required to deliver the high pressure fluid to the accumulator 34 or the first circuit section, the discharge pressure of the oil pump 27 is raised while switching the three-way solenoid valve 51 in a manner to connect the sub-filter Fb with the drain spot. As a result, the contaminants captured by the sub-filter Fb are allowed to be discharged directly to the drain spot. Here, the pressure level at the drain spot is substantially at the same level as the atmospheric pressure, and always lower than that in the accumulator 34. Therefore, removal of contaminants from the sub-filter Fb can be carried out at any time.

Here will be briefly explained a relation between the forgoing examples and the present invention. The on/off valves 35, 50, the three-way solenoid valve 51, and the means for carrying out the controls shown in FIGS. 2 and 3 serve as the contaminants removal means of the invention. The three-way solenoid valve 51 also serves as the switching valve of the invention.

In order to capture fine contaminants contained in the fluid to be delivered to the accumulator 34, according to the forgoing preferred examples, the finer sub-filter Fb is disposed on the passage for delivering the fluid to the accumulator 34 which is branched off from the passage for delivering the fluid from the oil pump 27 to the second circuit section 32. To this end, the position of the sub-filter Fb may be altered arbitrarily within a region possible to achieve the above-explained objective. For example, if the oil pump or the switching valve has two ports, the finer sub-filter Fb may also be disposed on a discharging side of the port communicated with the accumulator. In addition, although the on/off valve 35 is disposed on the upstream of the sub-filter Fb in the preferred examples shown in FIGS. 1 and 4, the on/off valve 35 may also be disposed on a downstream of the sub-filter Fb, that is, accumulator 34 side.

The invention claimed is:
1. A hydraulic circuit, comprising:
a first circuit section, which has an accumulator for storing hydraulic pressure, and a control valve for opening and closing a passage for delivering hydraulic fluid from the accumulator to a predetermined actuator;
an oil pump that delivers the hydraulic fluid to the accumulator;
a second circuit section to which the hydraulic fluid discharged from the oil pump is delivered continuously; and
a first filter that removes contaminants finer than those contained in the hydraulic fluid to be delivered to the second circuit section from the hydraulic fluid to be delivered to the accumulator;
wherein the first filter is disposed on another passage for delivering the hydraulic fluid to the accumulator branched off from a passage for delivering the hydraulic fluid from the oil pump to the second circuit section;
wherein the control valve includes a feeding valve that opens and closes the passage for delivering hydraulic fluid from the accumulator to the actuator, and a drain valve that withdraws the hydraulic fluid from the actuator;

wherein the feeding valve and the drain valve are adapted to close a port thereof by pushing a valve element onto a valve seat;

wherein the actuator includes a hydraulic chamber of an automatic transmission adapted to vary a speed ratio by delivering the hydraulic fluid thereto and withdrawing the hydraulic fluid therefrom;

wherein hydraulic pressure higher than that in the second circuit section is stored in the accumulator;

wherein the actuator includes a hydraulic chamber for controlling speed ratio that narrows a belt groove to increase an effective diameter of a belt by delivering the hydraulic fluid thereto, and a hydraulic chamber for controlling a belt clamping pressure that increases the belt clamping pressure by delivering the hydraulic fluid thereto;

wherein the second circuit section includes a lubrication point that is continuously lubricated by the hydraulic fluid delivered from the oil pump;

wherein the hydraulic circuit further comprises a second filter that removes contaminants from the hydraulic fluid passing therethrough that is discharged from the oil pump or sucked by the oil pump; and wherein a mesh size of the first filter is finer than that of the second filter.

2. The hydraulic circuit as claimed in claim 1, further comprising:

a first on/off valve, that is disposed on said another passage for delivering the hydraulic fluid from the oil pump to the accumulator to open and close said another passage.

3. The hydraulic circuit as claimed in claim 2, wherein the first on/off valve includes a switching valve that selectively opens said another passage, closes said another passage, and connects the accumulator with a drain spot.

4. A control system for the hydraulic circuit as claimed in claim 3, further comprising:

a contaminants removal means that removes contaminants captured by the first filter from the first filter by switching the switching valve in a manner to connect the accumulator with the drain spot.

5. A control system for the hydraulic circuit as claimed in claim 2, comprising:

a contaminants removal means that removes contaminants captured by the first filter from the first filter by switching the first on/off valve in a manner to open said another passage, when the hydraulic pressure in the accumulator is higher than a discharge pressure of the oil pump or the hydraulic pressure in the second circuit section.

6. The hydraulic circuit as claimed in claim 1, further comprising:

a bypass passage arranged on said another passage for delivering the hydraulic fluid from the oil pump to the accumulator to circumvent the first filter; and a second on/off valve that opens and closes the bypass passage.

7. A hydraulic circuit, comprising:

a first circuit section, which has an accumulator for storing hydraulic pressure, and a control valve for opening and closing a passage for delivering hydraulic fluid from the accumulator to a predetermined actuator;

an oil pump that delivers the hydraulic fluid to the accumulator;

a second circuit section to which the hydraulic fluid discharged from the oil pump is delivered continuously;

a first filter that removes contaminants finer than those contained in the hydraulic fluid to be delivered to the second circuit section from the hydraulic fluid to be delivered to the accumulator; and a contaminants remover that removes contaminants captured by the first filter from the first filter;

wherein the contaminants remover is adapted to allow the hydraulic fluid to flow from the accumulator side toward the second circuit section via the first filter.

8. The hydraulic circuit as claimed in claim 7, wherein the contaminants remover is adapted to remove the contaminants from the first filter at predetermined regular time intervals.

9. A hydraulic circuit, comprising:

a first circuit section, which has an accumulator for storing hydraulic pressure, and a control valve for opening and closing a passage for delivering hydraulic fluid from the accumulator to a predetermined actuator;

an oil pump that delivers the hydraulic fluid to the accumulator;

a second circuit section to which the hydraulic fluid discharged from the oil pump is delivered continuously; and a first filter that removes contaminants finer than those contained in the hydraulic fluid to be delivered to the second circuit section from the hydraulic fluid to be delivered to the accumulator;

wherein the actuator includes a hydraulic chamber for controlling speed ratio that narrows a belt groove to increase an effective diameter of a belt by delivering the hydraulic fluid thereto, and a hydraulic chamber for controlling a belt clamping pressure that increases the belt clamping pressure by delivering the hydraulic fluid thereto;

wherein the second circuit section includes a lubrication point that is continuously lubricated by the hydraulic fluid delivered from the oil pump; and wherein the hydraulic circuit further comprises a first on/off valve, that is disposed on said another passage for delivering the hydraulic fluid from the oil pump to the accumulator to open and close said another passage, and a contaminants removal means that removes contaminants captured by the first filter from the first filter by switching the first on/off valve in a manner to open said another passage, when the hydraulic pressure in the accumulator is higher than a discharge pressure of the oil pump or the hydraulic pressure in the second circuit section, and the clamping pressure is higher than a predetermined pressure.

10. A hydraulic circuit comprising:

a first circuit section, which has an accumulator for storing hydraulic pressure, and a control valve for opening and closing a passage for delivering hydraulic fluid from the accumulator to a predetermined actuator;

an oil pump that delivers the hydraulic fluid to the accumulator;

a second circuit section to which the hydraulic fluid discharged from the oil pump is delivered continuously; and a first filter that removes contaminants finer than those contained in the hydraulic fluid to be delivered to the second circuit section from the hydraulic fluid to be delivered to the accumulator;

wherein the actuator includes
a hydraulic chamber for controlling speed ratio that narrows a belt groove to increase an effective diameter of a belt by delivering the hydraulic fluid thereto, and
a hydraulic chamber for controlling a belt clamping pressure that increases the belt clamping pressure by delivering the hydraulic fluid thereto;
wherein the second circuit section includes a lubrication point that is continuously lubricated by the hydraulic fluid delivered from the oil pump; and
wherein the hydraulic circuit further comprises
a switching valve, that is disposed on said another passage for delivering the hydraulic fluid from the oil pump to the accumulator, and that selectively opens said another passage, closes said another passage, and connects the accumulator with a drain spot, and
a contaminants removal means that removes contaminants captured by the first filter from the first filter by switching the switching valve in a manner to connect the accumulator with the drain spot when the clamping pressure is higher than a predetermined pressure.

* * * * *